United States Patent
Herman et al.

(10) Patent No.: US 8,025,274 B2
(45) Date of Patent: Sep. 27, 2011

(54) INSERT BEARING PART, ELASTOMERIC INSERT BEARING AND SHOCK STRUT BEARING ASSEMBLY

(75) Inventors: Waldemar Herman, Jossgrund (DE); Volker Gruenig, Insel (DE); Hermann Sauer, Ronneburg (DE)

(73) Assignee: Anvis Deutschland GmbH (DE)

( * ) Notice: Subject to any disclaimer, the term of this patent is extended or adjusted under 35 U.S.C. 154(b) by 0 days.

(21) Appl. No.: 12/154,617

(22) Filed: May 22, 2008

(65) Prior Publication Data

US 2009/0116772 A1   May 7, 2009

(30) Foreign Application Priority Data

May 23, 2007  (DE) .................. 10 2007 023 886

(51) Int. Cl.
*B60G 13/00* (2006.01)
(52) U.S. Cl. ................ 267/220; 267/141.4; 267/141.7
(58) Field of Classification Search .... 267/141.1–141.7, 267/152, 153, 220
See application file for complete search history.

(56) References Cited

U.S. PATENT DOCUMENTS

| | | | |
|---|---|---|---|
| 2,414,743 A | | 1/1947 | Kaemmerling |
| 4,183,496 A | * | 1/1980 | Brock et al. ................. 248/638 |
| 4,877,262 A | * | 10/1989 | Tanahashi et al. ...... 280/124.155 |
| 5,165,669 A | * | 11/1992 | Mayerbock et al. ...... 267/140.12 |
| 6,908,076 B2 | * | 6/2005 | Hayashi et al. ............... 267/220 |
| 7,464,919 B2 | * | 12/2008 | Hermann et al. ............. 267/220 |

FOREIGN PATENT DOCUMENTS

| | | |
|---|---|---|
| BE | 435.962 | 9/1939 |
| DE | 1 650 926 | 2/1953 |
| DE | 1 208 638 | 1/1966 |
| DE | 4326197 C2 | 2/1994 |
| DE | 43 26 197 A1 | 2/1996 |
| EP | 0 385 416 | 9/1990 |
| EP | 0 885 757 A2 | 12/1998 |
| EP | 1 547 831 A2 | 6/2005 |
| EP | 1 564 037 A2 | 8/2005 |
| FR | 2 319 813 | 2/1977 |

* cited by examiner

*Primary Examiner* — Christopher Schwartz
(74) *Attorney, Agent, or Firm* — Kolish Hartwell, P.C.

(57) ABSTRACT

In an insert bearing part for combining with another insert bearing part structured the same or similar to form an elastomeric insert bearing there is provided a surrounding outer shell featuring a radial portion and an axial portion, an elastomeric body surrounded by the outer shell and a rigid core with an axial throughway for securing the insert bearing, said core protruding axially beyond the axial portion such that when locating the insert bearing part on the other insert bearing part structured the same or similar, the insert bearing parts contact each other substantially at the radial level of the core in forming an axial spacing between opposing axial portions of the insert bearing parts so that the elastomeric body is compressed by the insert bearing parts being brought together.

24 Claims, 1 Drawing Sheet

INSERT BEARING PART, ELASTOMERIC INSERT BEARING AND SHOCK STRUT BEARING ASSEMBLY

CROSS-REFERENCE TO RELATED APPLICATION

This application claims priority from German Patent Application No. 10 2007 023 886.1, filed May 23, 2007, the disclosure of which is incorporated herein by reference.

FIELD OF THE INVENTION

The invention relates to an insert bearing part which for forming an elastomeric insert bearing can be combined with another insert bearing part structured the same or similarly. The invention also relates to an elastomeric insert bearing for supporting a substantially axial extending component such as a shock absorber stem of a vehicle shock strut at a vehicle body, it usually being the case that the elastomeric insert bearing is accommodated in a mount fixed to the body of the vehicle. In conclusion, the invention relates to a shock strut bearing assembly including an elastomeric insert bearing in accordance with the invention.

BACKGROUND OF THE INVENTION

One such shock strut bearing assembly is known, for example, from German patent DE 43 26 197 C2 wherein at the end of a shock absorber stem an annular flange can be mounted which is surrounded by a rigid core. The rigid core in turn is surrounded by an elastomeric body which is precompressed by two shell parts to be connected together and separate from the elastomeric body before being fitted. The forces for applying precompression are achieved by bolt fasteners when fitting the shell parts to the vehicle body.

Mounting this shock absorber complicates fitting, however, because first the flange, the core as well as the elastomeric body need to be manufactured to form a module in a prefabrication step, after which the module has be secured to the flange of the shock absorber stem. Furthermore, mounting this known shock strut requires the outer shell parts to be precision dimensioned both axially and radially to ensure the module is precompressed as wanted.

SUMMARY OF THE INVENTION

The object of the invention is to provide an elastomeric body for an axially extending component on a vehicle body minimizing the complications in production and fitting.

This object is achieved by the features as set forth in claim 1. In accordance with the invention there is provided an insert bearing part for combining with another insert bearing part structured the same or similar to form an elastomeric insert bearing. The insert bearing part in accordance with the invention as well as the other insert bearing part are intended for insertion together in a component mount fixed to the vehicle body. The insert bearing part in accordance with the invention has a surrounding outer shell featuring a radial portion and an axial portion. In addition, the insert bearing part in accordance with the invention has an elastomeric body surrounded by the outer shell, the radial portion as well as the axial portion of the outer shell preventing the elastomeric body from being squeezed out of place when loaded radially or axially. In conclusion, the insert bearing in accordance with the invention has a rigid core with an axial throughway for securing the insert bearing, for example, to the end of a stem of shock strut. In accordance with the invention it is required that the core protrudes axially beyond the axial portion such that when placing the insert bearing part on the other insert bearing part structured the same or similar, the insert bearing parts contact each other substantially at the radial level of the core in forming an axial spacing between opposing axial portions of the outer shell so that the elastomeric body is compressed by the axial portions being brought together. In this arrangement, the radial portion and the axial portion prevent the elastomeric body from being squeezed out of place, as a result of which the elastomeric body of the insert bearing part can be converted into a defined precompressed condition on being fitted.

The insert bearing part in accordance with the invention now makes it possible to provide an elastomeric bearing for a substantially axially extending component, such as a shock absorber stem of a vehicle shock strut, the bearing being flexible and not necessarily necessitating a certain sequence in fitting. Furthermore, splitting the elastomeric insert bearing at least in two now permits more generous production tolerances. In addition to this, fitting is simplified, because, for one thing, the insertion character of the insert bearing part facilitates precisely positioning the insert bearing parts relative to the vehicle body, and, for another, securing the insert bearing is now much more simpler, by, for example, the mount being closed off by a corresponding cover when applying the pretension forces.

In a preferred aspect of the invention the insert bearing part comprises exclusively the outer shell, the elastomeric body and the rigid core. Preferably the insert bearing part is configured ring-shaped. In this arrangement the radial portion stands orthogonal to the axial portion.

In another preferred aspect of the invention the radial outer portion is formed without an axially directed component and the radial inner axial portion is formed without a radially directed component.

In another preferred aspect of the invention, at a free radial side facing away from the radial portion of the outer shell the elastomeric body comprises an axial undercut. This enables the nature and distribution of the precompression to be set within the elastomeric body on application of the fitting forces, depending on how the undercut is shaped and dimensioned.

To also permit setting precompression of the elastomeric body in the fitted condition the elastomeric body extends away from the core, particularly from a reinforced radial end of the core both axially and radially, whereby the axial expansion can be greater than the radial expansion preferably by more than 10%, 15% or 20%, preferably up to 30%.

In yet a further preferred aspect of the invention the elastomeric body totally covers the inner side of the outer shell, the elastomeric body preferably being bonded, particularly vulcanized to the outer shell.

In a preferred aspect of the invention the elastomeric body comprises a locating ledge on the core side ending level with the core axially and particularly a locating ledge on the shell side ending level with the outer shell axially. On attaining the fitted condition this results in first the elastomeric body being deformed on the core side to cause precompression. When the opposed ends of the outer shells contact each other, the locating ledge on the shell side comes into contact with the opposite locating ledge, resulting in a homogenous elastomeric body of the elastomeric insert bearing being formed from two insert bearing parts.

To assure fitting the elastomeric insert bearing being simple, a free side of the core of the insert bearing part facing away from the outer shell is structured flat.

In addition, the invention relates to an elastomeric insert bearing for supporting a substantially axial extending component such as a shock absorber stem of a vehicle shock strut on a vehicle body and for fitting in a body-side mount. The insert bearing is provided with a rigid core comprising an axial throughway for securing the component, an elastomeric body radially surrounding the core at least in part and two outer shells arranged inline axially and surrounding the elastomeric body at least in part. In accordance with the invention in a prefitted condition the two outer shells are captively secured to the elastomeric body in forming between them an axial spacing. Because of the flexibility and elasticity of the elastomeric body the outer shell parts can be moved to join axially such that the elastomeric body is precompressed for a final fitting condition. With the elastomeric insert bearing in accordance with the invention, fitting the shock strut is now simplified in that the stem of the shock strut coupled to the elastomeric insert bearing via the through passage of the core simply needs to be inserted in a mounting fixture of a component fixedly secured to the vehicle body. In other words, production personnel just has to handle a single component for the elastomeric insert bearing. This significantly reduces the complications in fitting whilst practically exluding fitting errors.

In still another preferred aspect of the invention the outer shells and an assigned elastomeric body portion are bonded, particularly vulcanized together. In a preferred aspect of the invention each outer shell is ring-shaped and features an outer axial portion particularly without a radially directed component and an inner radial portion without an axially directed component. The free ends of the axial portions may face each other and particularly are located on each other in the prefitted condition preferably in forming a substantially stepless transition at their inner and/or outer side.

Preferably each outer shell can be assigned a surrounding, particularly ring-shaped elastomeric body portion, both elastomeric body portions defining a recess extending radial inwards from a radial outer side particularly in the region of a radial centerline. In this arrangement, in the prefitted condition, the recess has substantially the shape of a mushroom, particularly the stalk of the mushroom shape being defined by the outer shells at least in part. Preferably, when fitted, the recess has a delta shape, particularly in the shape of an arrowhead pointing radially inwards. Furthermore at least one or both elastomeric bodies comprise(s) at the recess an axial undercut. In another preferred aspect of the invention, in the region of a facing radial side the elastomeric bodies are shaped such that in the fitted condition exclusively the elastomeric bodies define a cavity, defined particularly by the undercuts of the elastomeric body portions. With the arrangement of the recess, the undercuts, the cavity, etc precompression can now be adapted in direction and extent within the elastomeric body as a function of the application of the insert bearing.

In a preferred aspect of the invention the outer shells, the elastomeric body and/or the recess are symmetrically shaped in relation to a radial axis, particularly to a radial centerline of the insert bearing. In this arrangement the outer shells, the elastomeric body and/or the recesses can be symmetrically shaped in relation to an axial axis, particularly to a rotational axis of the insert bearing.

In still a further preferred aspect of the invention for setting the precompression of the elastomeric body on attaining the fitted condition, the elastomeric body extends away from the core particularly from a reinforced radial end of the core both axially and radially in the prefitted condition of the insert bearing, the axial expansion being greater than the radial expansion preferably by more than 10%, 15% or 20%, preferably up to 30%. Preferably in the final fitted condition the elastomeric body extends away from the core particularly from a reinforced radial end of the core both axially and radially, a radial expansion being greater than the axial expansion preferably by more than 20%, 30% or 50%, preferably up to 60%.

In another preferred aspect of the invention the insert bearing consists of two structurally separate insert bearing parts configured as described above in accordance with the invention.

Preferably radial facing, particularly flat surfaces of the cores are shaped to complementary locate full-surfaces on each other in the fitted condition. In another preferred aspect of the invention the elastomeric body of each insert bearing part forms a facing core-sided contact location and a facing shell-sided contact location, in the prefitted condition the core-sided contact locations being on each other and the shell-sided contact locations are located axially spaced away from each other and in the fitted condition the core-sided contact locations and the shell-sided contact locations are each located contacting.

Preferably the contact locations are formed by an axial ridge, particularly the radial thickness of the axial ridges being substantially equal.

Furthermore, the invention relates to a shock strut bearing assembly including a mount for an insert bearing formed either by a plate-shaped component attached to the vehicle body or by the body itself. Inserted in the mount is an insert bearing in accordance with the invention. The insert bearing can be preferably retained in the recess by a ring-shaped cover, particularly with an axial throughway.

BRIEF DESCRIPTION OF THE DRAWINGS

Further properties, advantages and features of the invention will now be detained by the preferred aspects of the invention as described with reference to the attached drawings in which.

DETAILED DESCRIPTION OF SELECTED EMBODIMENTS OF THE INVENTION

Figure 1:
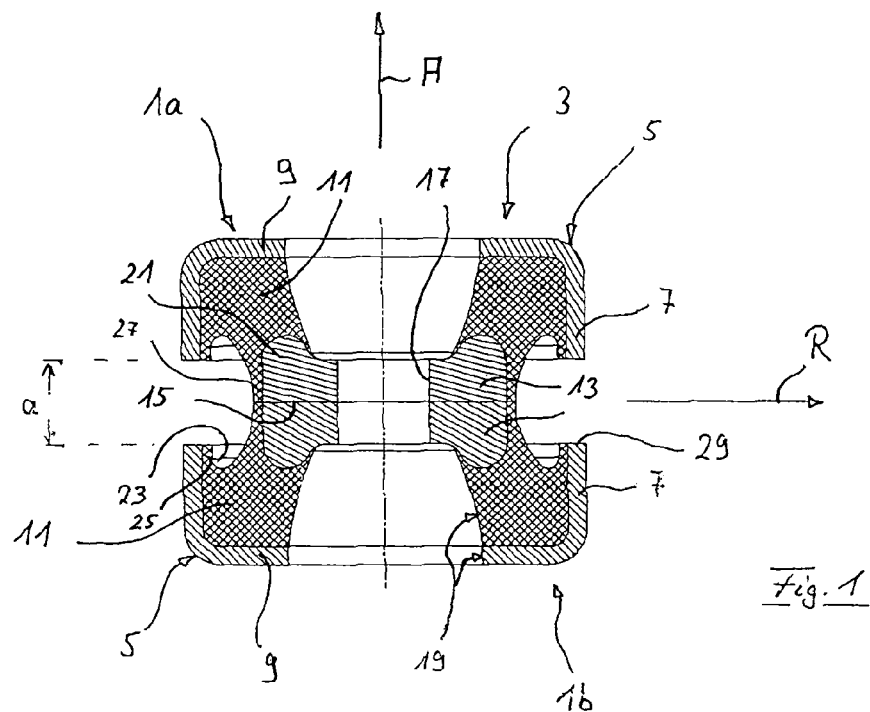
FIG. 1 is a cross-sectional view of an assembly of two insert bearing parts structured identical for forming an insert bearing in accordance with the invention.

Referring now to FIG. 1 there is illustrated how an elastomeric insert bearing 3 is formed by two insert bearing parts each structured identical and generally denoted by the reference numeral 1*a*, 1*b*.

Each insert bearing part 1*a*, 1*b* comprises an outer shell 5 consisting of an axial ring 7 and oriented orthogonal thereto a radial ring 9.

The inner side of the outer shell 5 is totally covered by an annular elastomeric body 11 connected to a rigid core 13.

The rigid core 13 has a flat radial side 15 facing the rigid core 13 of the opposing insert bearing part 1*a*, 1*b*. In addition, the core 13 has a throughway 17 through which a stem of a shock strut can extend for securing the insert bearing 3 in accordance with the invention to the stem. To render the end of the stem freely accessible both the outer shells 5 and the elastomeric bodies 11 feature a concentrically configured port 19.

The elastomeric body 11 extends from a flared radial end 21 of the core 13 inclined in both the axial direction A and in the radial direction R outwardly, the elastomeric body 11 gradually becoming thicker cross-sectionally.

At its side surface facing the elastomeric body 11 of the other insert bearing part 1a, 1b the elastomeric body 11 is machined with an undercut 23 partly defined by a radial outboard axial ridge 25 at the outer shell side as well as by a radial inboard axial ridge 27 at the core side.

As evident from FIG. 1 in the prefitted condition of the insert bearing 3 in accordance with the invention as shown the core 13 significantly extends axially beyond the free end 29 of the axial ring 7 of the outer shell 5 so that when the insert bearing parts 1a, 1b are juxtaposed the flat sides of the core locate on each other, an axial spacing a being formed between the free ends 29 of the axial rings 7. It will readily be appreciated that the axial ridge 27 on the core side extends up to the flat side of the core 13 whilst the axial ridge 25 on the shell side merges up to the free end 29 of the outer shell 5. In the prefitted condition the axial ridges 25, 27 are axially staggered.

Figure 2:
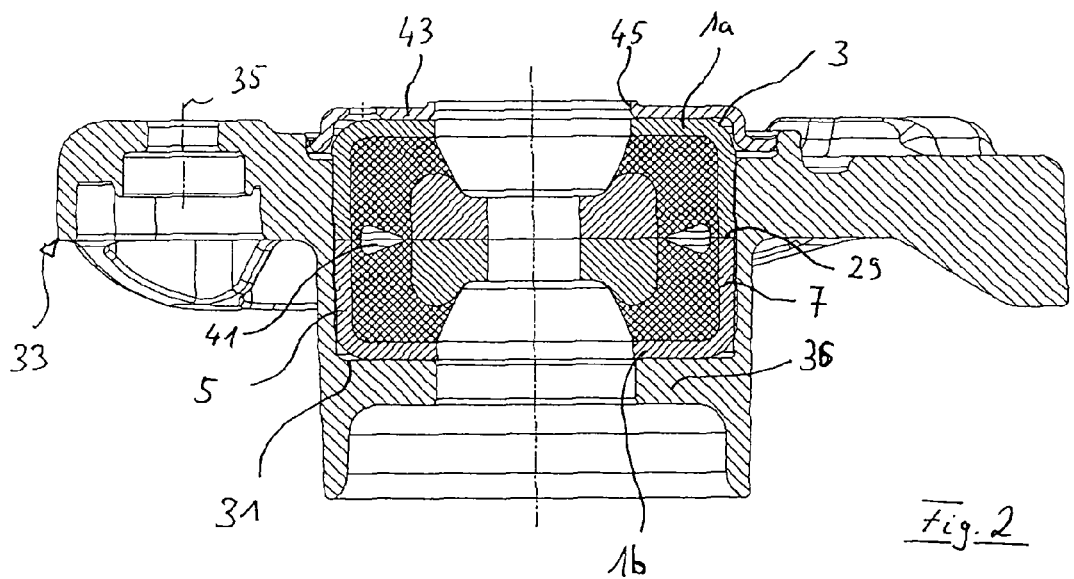
FIG. 2 is a cross-sectional view of an elastomeric insert bearing employed in a mount fixedly secured to a vehicle body

Referring now to FIG. 2 there is illustrated the insert bearing 3 in accordance with the invention in the fitted condition in a mount 31 of a plate-shaped flange 33 bolted to a vehicle body (not shown) by bolts 35. The mount 31 is formed by a cylindrical recess in the flange 33 axially defined partly by the step 36. Provided at the step 36 is a concentric opening through which the stem of the shock strut can extend.

The cylindrical recess of the mount 31 is dimensioned such that the insert bearing 3 is directly insertable in the mount 31, possibly with a clearance or transition fit.

In fitting, the outer shells 5 are axial located on each other so that the free ends 29 of the axial rings 7 come into contact, reducing the axial expansion of the elastomeric body 11 as compared to that in its prefitted condition until the axial extent of the elastomeric body 11 is smaller than its radial extent, i.e. in the fitted condition the elastomeric body 11 is strongly precompressed.

The elastomeric body 11 of the two insert bearing parts 1a, 1b defines a cavity 41 formed inwards arrow-shaped in FIG. 2. To maintain the elastomeric insert bearing 3 compressed a cover 43 is secured to the mount 31 at the side of the insert bearing 3 facing away from the shock strut, the flange 33 likewise featuring a concentric opening 45 as well as free access to the stem of the shock strut.

When the insert bearing parts 1a, 1b are located on each other the rigid core 13 takes the shape of a bone with a throughway hole in the middle. The elastomeric insert bearing 3 in accordance with the invention now simplifies fitting and achieving an elastomeric bearing for the stem of a vehicle body shock strut. The elastomeric body 11 and the outer shell 5 are shaped to provide homogenous precompression within the elastomeric body 11.

It is understood that the features of the invention as disclosed in the above description, in the drawings and as claimed may be essential to achieving the invention both by themselves or in any combination.

The invention claimed is:

1. An elastomeric insert bearing for supporting a substantially axial extending shock absorber stem of a vehicle shock strut on a vehicle body and for fitting in a body-side mount, including a rigid core comprising an axial throughway for securing the stem, an elastomeric body radially surrounding the core at least in part and two outer shell parts arranged inline axially and surrounding the elastomeric body at least in part, characterized in that in a prefitted condition the two outer shell parts are captively secured to the elastomeric body thereby forming between them an axial spacing for a joining movement axially such that the elastomeric body is precompressed for a fitted condition, wherein each outer shell is associated with a surrounding ring-shaped elastomeric body portion, such that both elastomeric body portions in combination define a recess extending radially inwards from a radial outer side, in the region of radial centerline, characterized in that in the fitted condition the recess has a delta shape.

2. The insert bearing according to claim 1, characterized in that the outer shells and an assigned elastomeric body portion are bonded together.

3. The insert bearing according to one of claim 1 or 2, characterized in that each outer shell is ring-shaped and features an outer axial portion particularly without radially directed component and an inner radial portion without an axially directed component, the free ends of the axial portions facing each other and particularly are located on each other in the fitted condition.

4. The insert bearing according to claim 1, characterized in that the elastomeric bodies of the insert bearing parts each form a facing core-sided contact location and a facing shell-sided contact location, whereby in the prefitted condition the core-sided contact locations connect each other and the shell-sided contact locations are located axial spaced away from each other and in the fitted condition the core-sided contact locations and the shell-sided contact locations, respectively, are in contact with each other.

5. The insert bearing according to claim 4, characterized in that the contact locations are formed by an axial ridge.

6. The insert bearing according to claim 1, characterized in that one or both portions of the elastomeric body comprise(s) at the recess an axial undercut.

7. The insert bearing according to claim 6, characterized in that in the region of a facing radial side the elastomeric body portions are shaped such that in the fitted condition exclusively the axial undercuts of the elastomeric body portions define a cavity.

8. A shock strut bearing assembly including a mount for an insert bearing structured as set forth in claim 1.

9. The shock strut bearing assembly according to claim 8 wherein the insert bearing is retained in the recess by a particularly ring-shaped cover.

10. The insert bearing according to claim 1, characterized in that in the prefitted condition the recess has substantially the shape of a mushroom, wherein the stalk of the mushroom shape is defined by the outer shells at least in part.

11. The insert bearing according to claim 1, characterized in that at least one of the outer shells, the elastomeric body, and the recesses are symmetrically shaped in relation to a radial axis.

12. The insert bearing according to claim 1, characterized in that at least one of the outer shells, the elastomeric body, and the recesses are symmetrically shaped in relation to an axial axis.

13. The insert bearing according to claim 1, characterized in that in the prefitted condition the elastomeric body extends away from the core an axial expansion being greater than the radial expansion.

14. The insert bearing according to claim 1, characterized in that in the fitted condition the elastomeric body extends away from the core, a radial expansion being greater than the axial expansion.

15. The insert bearing according to claim 1, characterized in that the insert bearing consists of two structurally separate insert bearing parts configured as set forth in any one of the claims 1, 2, and 4-10.

16. The insert bearing according to claim 1, characterized in that radial facing are shaped to complementary locate on each other in the fitted condition.

17. An elastomeric insert bearing for supporting a substantially axially extending shock absorber stem of a vehicle shock strut on a vehicle body and for fitting in a body-side mount, the elastomeric insert bearing comprising:

two structurally separate insert bearing parts that are each configured such that when combined with another insert bearing part having a substantially similar structure the combined insert bearing parts form said elastomeric insert bearing; each insert bearing part in turn comprising a rigid core that includes an axial throughway adapted for securing the shock absorber stem;

an elastomeric body that at least partially radially surrounds the rigid core; and two outer shell parts arranged in line axially and at least partially surrounding the elastomeric body, each insert bearing part comprising a surrounding outer shell having a radially inner radial portion and a radially outer axial portion, wherein the axial portion has no radially directed component and the inner radial portion has no axially directed component; and wherein said rigid core extends axially beyond the radially outer axial portion such that the combined insert bearing parts contact each other substantially at the radial level of the core whereby an axial spacing between opposing axial portions of the outer shell is formed;

wherein the elastomeric insert bearing has a prefitted condition and a fitted condition; the prefitted condition characterized in that the two outer shell parts are captively secured to the elastomeric body and the axial spacing therebetween permits an axial joining movement of the outer shell parts and a consequent precompression of the elastomeric body, resulting in said fitted condition.

18. The insert bearing part according to claim 17 consisting of the outer shell, elastomeric body and rigid core.

19. The insert bearing part according to one of claim 18 or 17, where the insert bearing part is configured to be ring-shaped.

20. The insert bearing part according to claim 17 wherein the radial portion of the outer shell stands orthogonal to the axial portion of the outer shell.

21. The insert bearing part according to claim 17 wherein at a free radial side facing away from the radial portion of the outer shell the elastomeric body comprises an axial undercut.

22. The insert bearing part according to claim 17 wherein the elastomeric body totally covers the inner side of the outer shell.

23. The insert bearing part according to claim 17 wherein the elastomeric body comprises a locating ledge on the core side ending level with the core axially.

24. The insert bearing part according to claim 17 wherein a free side of the core facing away from the outer shell is structured flat.

* * * * *